United States Patent [19]

Thayer

[11] Patent Number: 4,885,862

[45] Date of Patent: Dec. 12, 1989

[54] GAFFS, AUTOMATIC GAFFS, AND MECHANISMS THEREFOR

[76] Inventor: Timothy Thayer, 13411 Oakledge, Houston, Tex. 77065

[21] Appl. No.: 336,011

[22] Filed: Apr. 10, 1989

[51] Int. Cl.⁴ .............................................. A01K 97/14
[52] U.S. Cl. ................................................ 43/6; 43/34
[58] Field of Search ........................... 43/5, 6, 15, 37, 34

[56] References Cited

U.S. PATENT DOCUMENTS

| | | |
|---|---|---|
| 542,315 | 7/1895 | Sanguinette . |
| 545,960 | 9/1895 | Langford et al. . |
| 776,425 | 11/1904 | Riggs . |
| 1,033,755 | 7/1912 | Calvert .................................... 43/34 |
| 1,080,868 | 12/1913 | Turner . |
| 1,832,727 | 11/1931 | Nixon . |
| 2,009,298 | 7/1935 | Nelson et al. ............................ 43/34 |
| 2,704,052 | 3/1955 | Wood ................................... 119/153 |
| 3,102,355 | 9/1963 | Horn, Jr. .................................... 43/6 |
| 3,183,031 | 5/1965 | Haberstick ............................. 294/19 |
| 3,456,376 | 7/1969 | Chappell .................................... 43/6 |
| 3,747,253 | 7/1973 | Gangi et al. ............................... 43/4 |
| 3,863,377 | 2/1975 | Leonard .................................... 43/6 |
| 4,148,512 | 4/1979 | Pendlebury ........................... 294/26 |
| 4,547,989 | 10/1985 | Karlsson .................................... 43/5 |
| 4,720,932 | 1/1988 | Bovino ...................................... 43/5 |

Primary Examiner—Nicholas P. Godici
Assistant Examiner—Michael William Starkweather

[57] ABSTRACT

A gaff for hooking a target such as a fish, an animal, or an object. In one embodiment the gaff has a handle, a hook, a spring mechanism connected to the hook, a tensioning device for stretching the spring, an automatic trigger actuable to release the spring and move the hook into the target, a manually actuable trigger, a safety device for preventing unwanted automatic actuation of the gaff, a weight scale and a fish scale. In other embodiments, gaffs according to this invention have one or more, but not all, of these aspects.

9 Claims, 10 Drawing Sheets

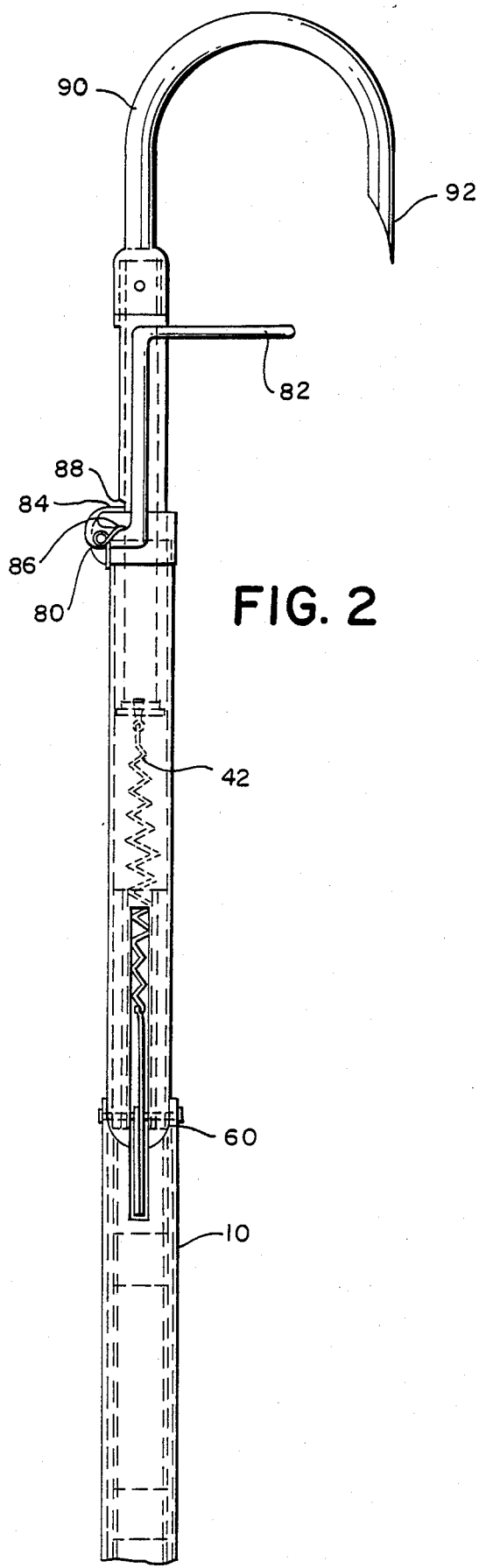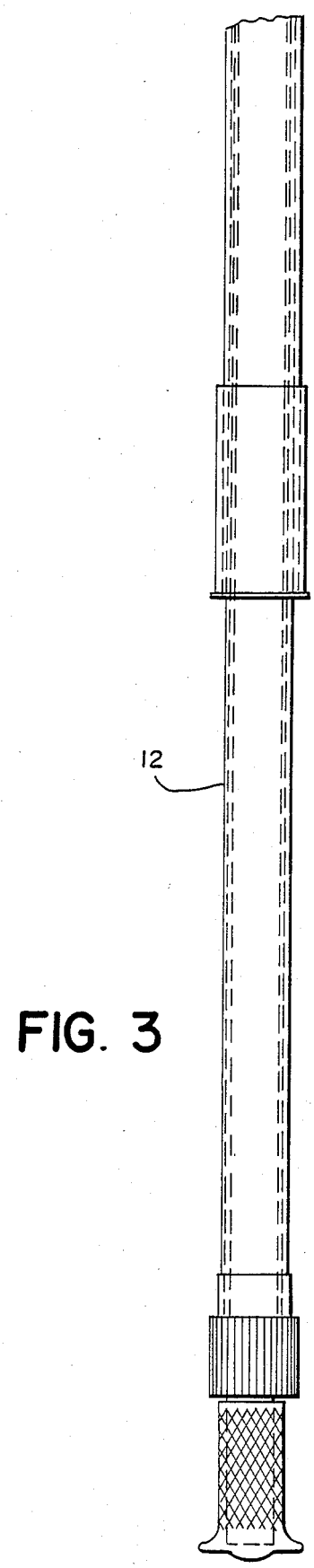

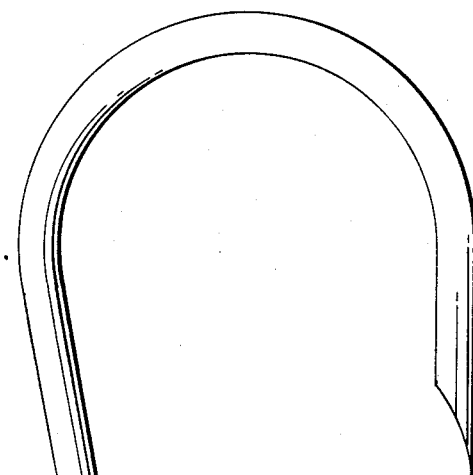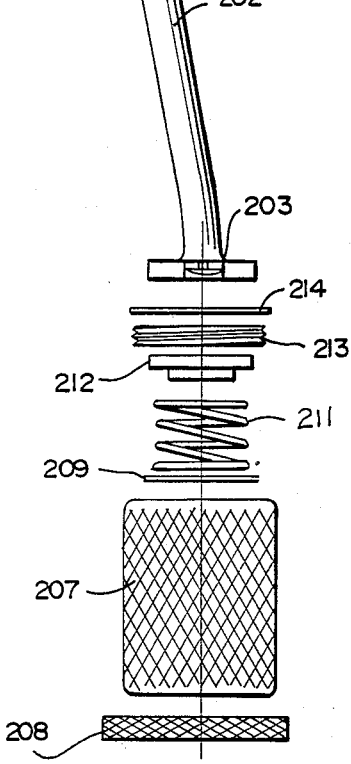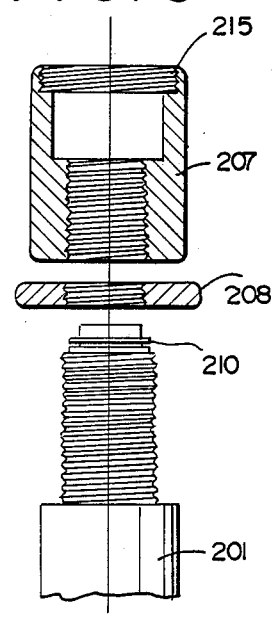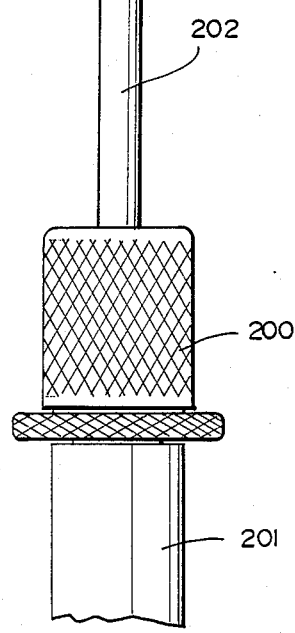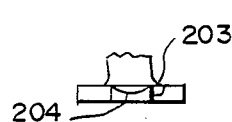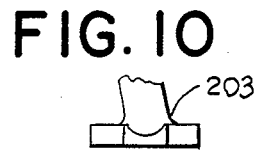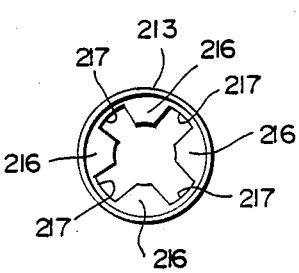

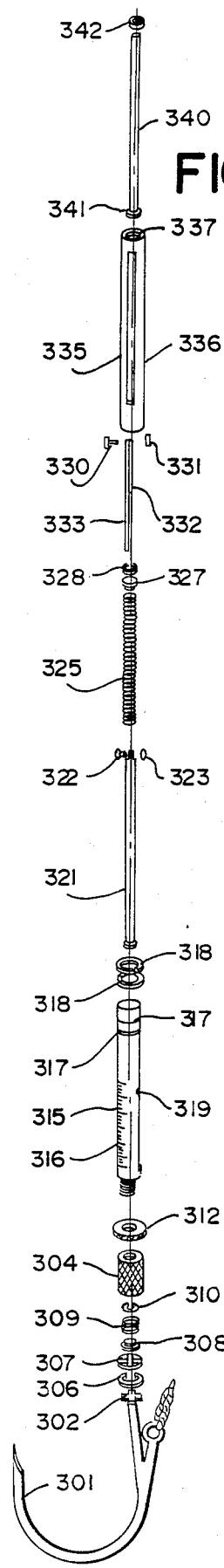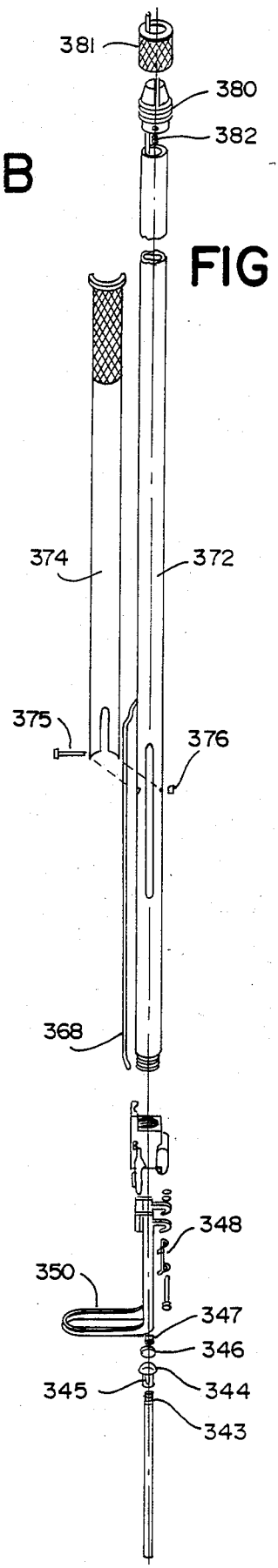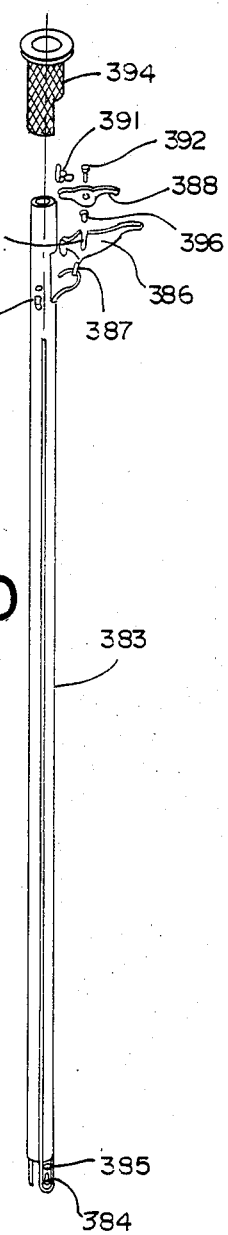

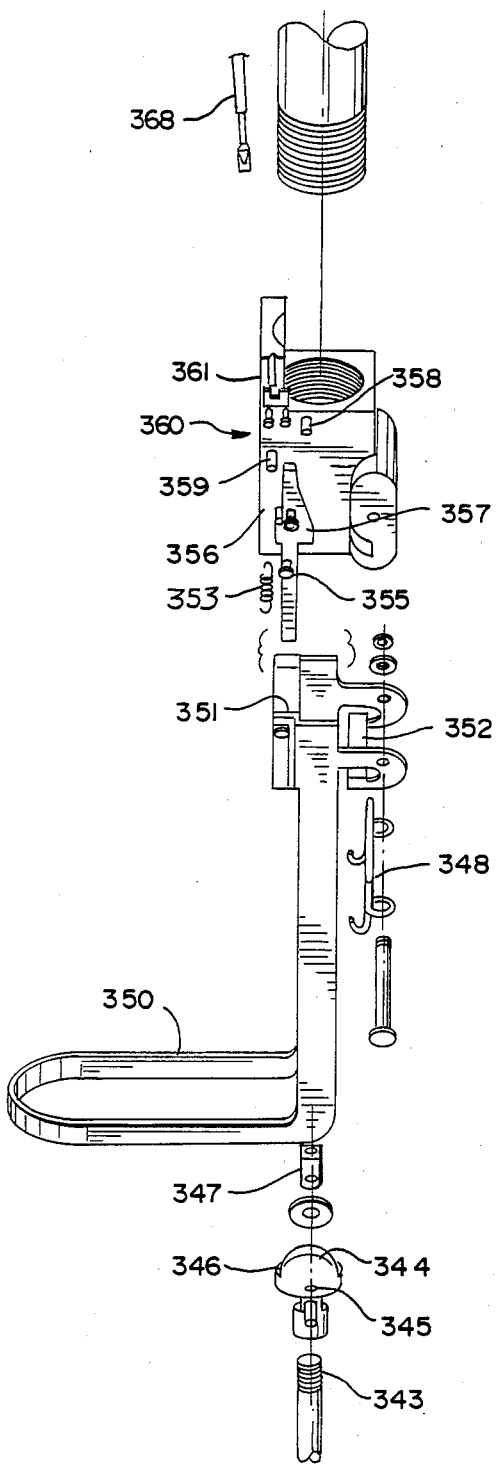
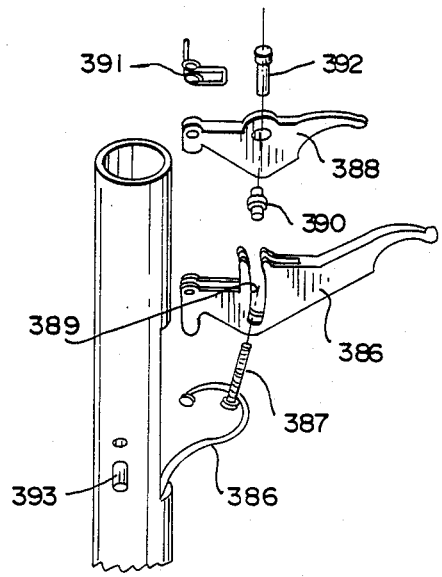
FIG. 16H
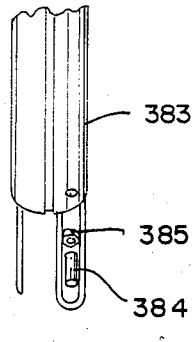
FIG. 16I
FIG. 16G

GAFFS, AUTOMATIC GAFFS, AND MECHANISMS THEREFOR

BACKGROUND OF THE INVENTION

1. Field of the Invention

This invention is directed to gaffs, in one embodiment particularly to fishing gaffs or landing gaffs; and in one embodiment specifically to an automatic spring-loaded fishing gaff which is convertible to a flying gaff.

2. Description of the Prior Art

A landing gaff is a pole with a sharp hook on one end. When fishing for large game fish or sharks, where hand landing or netting the catch is not practical, a gaff is used. When the fish is brought alongside the boat, or to the base of a pier or jetty, the gaff is used to hook and hoist the catch aboard. In the case of a larger fish, a flying gaff is used. A flying gaff is used in much the same way that a conventional gaff is used, with the exception that once the hook is placed, the pole is removed, and the hook and fish are retained on a rope. This makes handling the larger catches easier and safer.

The prior art discloses a variety of fishing gaffs all of which generally have some type of hook or spear for piercing a fish and some type of handle. It is known in this art to use spring-loaded spears and spring-biased tong-like gaffs. It is also known to use a gaff hook releasably mounted to a handle.

A variety of problems are associated with the use of prior art gaffs. Many fish have very tough skin or scales and considerable force is needed to pierce such skin or scales.

In accordance with 37 C.F.R. 1.56, the following are disclosed: U.S. Pat. Nos.
1,080,868
1,832,727
2,704,052
3,102,355
3,183,031
3,456,376
3,747,253
4,148,512
4,720,932
542,315
545,960
776,425

There has long been a need for an effective automatic gaff. There has long been a need for such a gaff which is easily convertible to a flying gaff. There has long been a need for such a gaff with easily interchangeable hooks. There has long been a need for a safe gaff which will prevent a fish from slipping off. The present invention recognizes, addresses, and satisfies these needs.

SUMMARY OF THE INVENTION

If a gaff is not handled correctly, the fish may be lost and may subsequently die from a fatal wound. There is also the possibility of injury to the user and others nearby.

The gaff is set into the fish after the angler has managed to bring the fish alongside the boat. Gaffing is achieved by the angler, or in most cases by a mate. As the fish swims near the boat, the gaff hook is placed in the water to the opposite side of the fish from the user It is the user's responsibility to align the gaff hook with a point on the fish suitable for gaffing. When the gaff is aligned with this area, the user must yank back on the gaff with enough force to penetrate the tough skin and or scales of the fish. At first glance, this may not seem too difficult. But it is at this time that most fish are lost, often with large gashes in their much needed protective scales and skin. This is also one of the few opportunities for injury to the user or others on the boat, in an otherwise almost injury-free sport.

The problems encountered when trying to gaff a fish occur when the user yanks back to set the hook. The visual distortion caused by the waters' surface is a contributing factor. This problem is intensified the further the user is from the fish, as in fishing from piers, jettys, and large vessels. This distortion can prevent the user from gaining a positive alignment with the fish. Often the gaff pole cannot be laid against the fish to aid in the alignment. (If the gaff pole touches the fish prior to gaffing, the fish will more than likely spook, and the result is either a missed gaff or possibly a broken line and lost fish.) The user relies on experience and guesswork when setting the gaff.

Pulling back on the gaff pole to set the hook, once it is aligned, requires considerable force. This movement can often change the gaff alignment resulting in a lost fish. Worse yet, the user might graze the fish, causing grave damage to the fish's skin. These fish can break free and may be left fatally wounded.

Another possibility during the setting of the gaff hook is injury to the user or others. Often the user's rapid body movement will cause him to strike an object in or on the boat with an elbow or other upper body part. The possibility that the end of the gaff pole would strike another person is always present; (it seems that everybody wants to watch.) This often leaves the user inadequate room to maneuver.

Another problem with prior art gaffs is that a fish can flip off the gaff hook.

The present invention is directed to a gaff which in one embodiment has a handle and a hook. The hook is automatically movable to pierce a fish, securely embedding the hook in the fish. A spring mechanism in the gaff handle is connected to the hook so that upon release of the spring the hook is forced into the fish. In one embodiment an extending trigger arm can be used which, upon contacting the fish, releases the hook. A cocking apparatus can be provided to easily cock the spring mechanism so that the gaff can be re-used again after the hook has been once released. The gaff hook can be releasably secured to the gaff handle so that if a flying gaff is desired, the gaff hook (with a rope tied thereto) can be released. Also, the handle and hooks can be configured so that the handle can receive and hold hooks of differing sizes, dimensions, or configurations.

It is therefore an object of the present invention to provide a novel, efficient, useful, and nonobvious gaff.

Another object of this invention is the provision of such a gaff which provides for the automatic forceful release of a hook which is part of the gaff so that the hook pierces the skin or scales of a fish or animal.

A further object of this invention is the provision of a gaff which can have a variety of interchangeable and releasable hooks.

Yet another object of this invention is the provision of a gaff which has a spring-loaded mechanism which is easily re-set for providing the force to move the gaff hook.

An additional object of this invention is the provision of a gaff having a trigger apparatus for releasing a hook of the gaff, the trigger apparatus configured and disposed so that either the gaff operator can manually release the hook when desired or the trigger apparatus can be brought into contact with a fish (or animal) to automatically release the gaff hook, or both. A particular object of this invention is the placement of such a trigger apparatus to maximize hook acceleration so that the gaff hook is a certain distance from the fish when the trigger apparatus releases the hook.

Another object of this invention is the provision of a gaff which has a handle but which can easily be converted into a flying gaff.

Another object of this invention is the provision of a gaff which has a weighing apparatus incorporated into the gaff.

To one of skill in this art who has the benefit of this invention's teachings, other and further objects and advantages, as well as those inherent therein, will be clear from the following description of presently-preferred embodiments of the invention, given for the purpose of disclosure, when taken in conjunction with the drawings described below.

DESCRIPTION OF THE DRAWINGS

FIG. 2 is an enlarged view of part of the apparatus of FIG. 1.

FIG. 3 is an enlarged view of part of the apparatus of FIG. 1.

FIG. 7 is an exploded view of the gaff hook coupler, piston, and gaff of FIG. 8.

FIG. 8 is a side view of a gaff hook coupler (with a gaff hook and gaff piston) according to this invention.

FIG. 9 is a side view, partially in crosssection, of various components of the coupler of FIG. 8.

FIG. 10 is a side view of the base of the hook of FIG. 8.

FIG. 11 is a side view of the base of the hook of FIG. 8.

FIG. 12 is a bottom view of the base of the hook of FIG. 8.

FIG. 13 is a top view of a gaff hook retaining ring shown in FIG. 7.

FIG. 14 is a side view in crosssection of the ring of FIG. 13.

FIG. 16 shows a side view, partially cutaway, of a gaff according to the present invention.

FIGS. 16b–d show exploded views comprising the gaff of FIG. 16a.

FIGS. 16e–i show enlargement views of various portions of the gaff of FIG. 16a.

FIGS. 17a,b are side views, partially cutaway, of manual and automatic trigger assemblies according to this invention.

The following disclosure is offered for public dissemination in return for the grant of a patent. Although it is detailed to ensure adequacy and aid understanding, this is not intended to prejudice the appended claims' coverage of other embodiments no matter how others may later disguise them by variations in form or additions or further improvements. The claims at the end hereof are intended as the chief aid toward this purpose, as it is these that meet the requirement of claiming the invention's subject matter.

DESCRIPTION OF PRESENTLY-PREFERRED EMBODIMENTS

Figure 1:
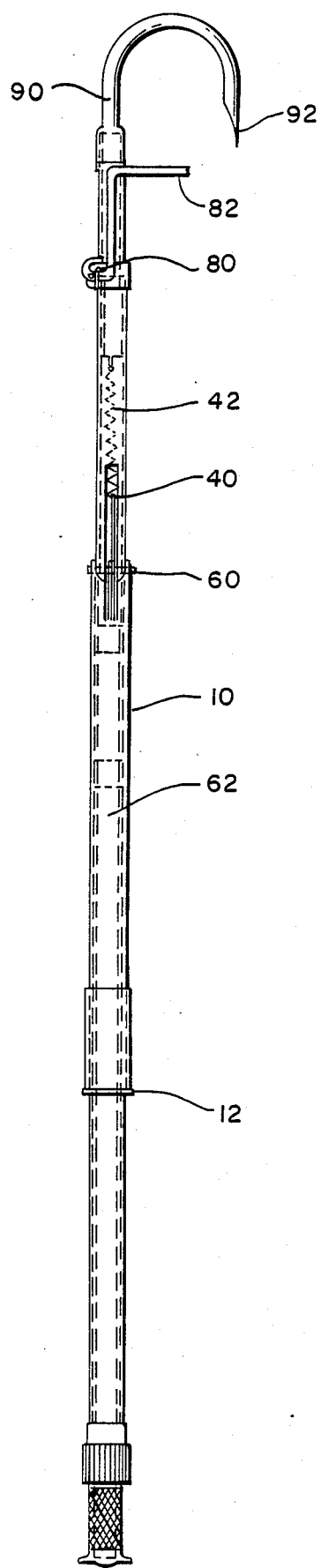
FIG. 1 is a side view, partially cutaway, of a gaff according to the present invention.

As shown in FIG. 1 a gaff 10 according to the present invention has a hollow handle 12, a spring-loaded mechanism 40, a cocking mechanism 60, a trigger mechanism 80 and a hook 90. The spring-loading mechanism 40 is shown in a cocked or loaded position so that upon release of the trigger mechanism 80 the spring is released to pull the hook 90 backward with a desired force, e.g. a force of sufficient strength so that the hook penetrates a fish's skin or scales.

A trigger 82 of the trigger mechanism 80 is configured and disposed so that the fish can be contacted by the trigger 82. The distance of the trigger 82 from a point 92 of the hook 90 can be established for a particular application; or an adjustable trigger (not shown) can be used, e.g. with a telescoping member, so that the trigger-hook point distance can be set as desired.

The cocking mechanism 60 has a handle 62 which is movable to stretch a spring 42 of the spring-loading mechanism 40, thereby loading the gaff 10 for automatic action.

Figure 4:
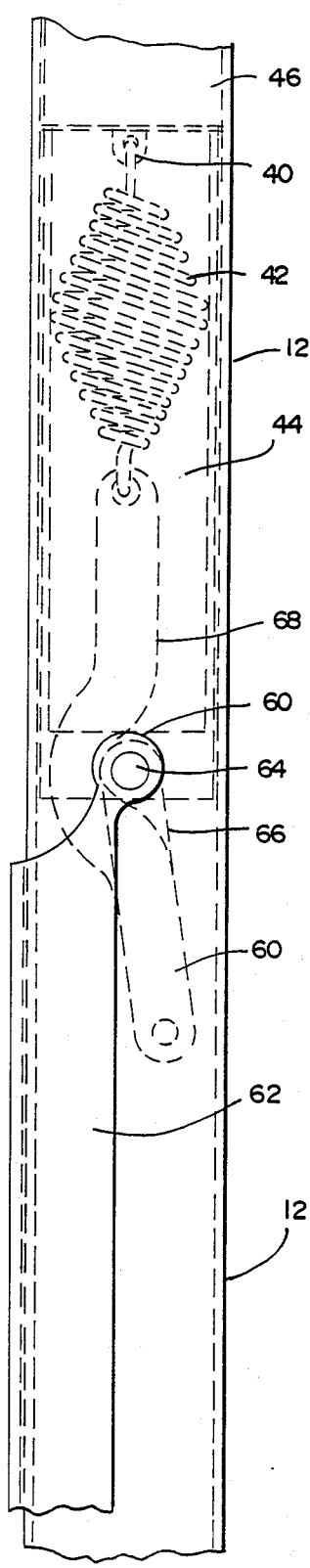
FIG. 4 is an enlarged crosssectional view of a cocking device for the apparatus of FIG. 1.
Figure 5:
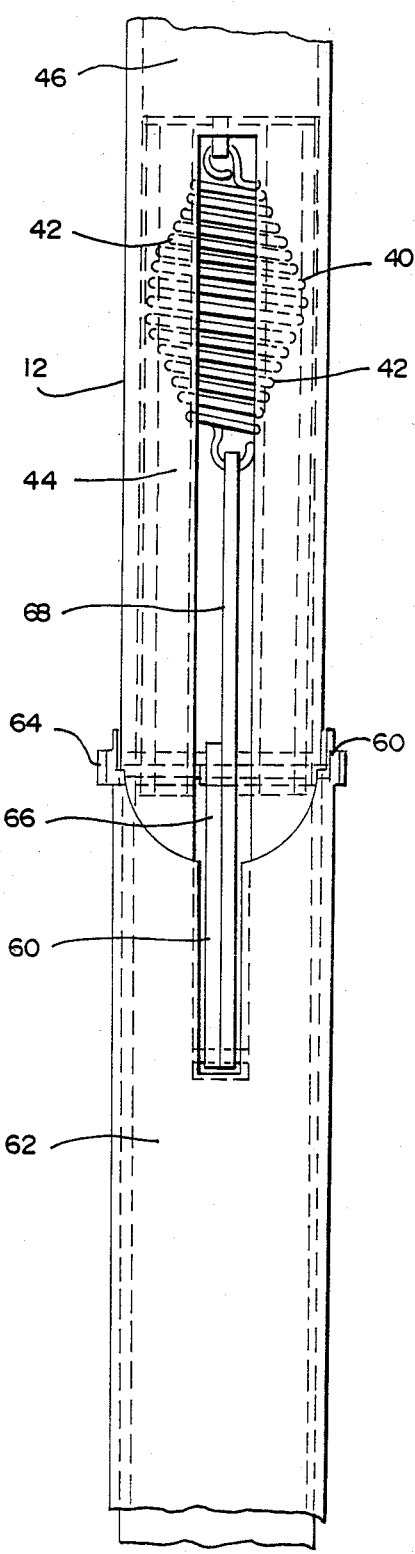
FIG. 5 is a side view of the apparatus of FIG. 1.

Referring now to FIGS. 2, 4 and 5 the cocking mechanism 60 has a cocking lever 62 to which is mounted an axle pin 64 which extends through the handle 12. The cocking lever 62 cocks the gaff by extending a gaff hook piston 46 in one direction and expanding the spring 42 in the other direction. The gaff hook piston 46 is secured at one end to the hook 90 and at the other end to the spring 42.

When an angler retrieves a catch and the gaff 10 is to be used to land the fish, the gaff 10 can be cocked and ready to go in one motion. The cocking lever 62 is swung away from the gaff handle 12. The cocking lever 62 rotates the axle pin 64 of the cocking mechanism 60. A drive link 66 of the cocking mechanism 60 is mounted non-rotatably to the axle pin 64. The drive link 66 forces a driven link 68 against the drive spring 42. The driven link 68 is secured at one end to the spring 42 and at the other end to the drive link 66. The drive spring 42 is forced against the gaff hook piston 46. As the cocking lever 62 rotates the axle pin 64, the gaff hook piston 46 is forced out the end of the hollow gaff handle 12. When the cocking lever 62 has been moved to the extent of its travel, the user reverses direction. The cocking mechanism 60 now begins to pull on the drive spring 42, which in turn pulls on the gaff hook piston 46. A trigger locking bar 84 will be moved by the tension of a spring 86 into a locking groove 88, preventing the piston 46 from retracting. With the piston 46 held in place, the cocking lever 62 will begin to extend the drive spring 42. When the cocking lever 62 returns to rest against the gaff handle 12, the gaff is cocked and ready to use.

The gaff is now used as if it were a conventional gaff, with the exception of setting the hook. This is done automatically. As the user approaches the fish with the gaff hook 92, the fish will come into contact with the gaff trigger 82. As the user applies pressure against the fish 82, the trigger 82 will rotate the locking bar 86 out of the locking groove 88 in the gaff hook piston 46. This occurs when the fish is approximately one inch from the gaff hook 90. The spring tension of spring 42 (preferably approximately 75 pounds), is now able to retract the gaff hook piston 46, driving the gaff hook 90 into the fish or shark. The gaff is then used as a conventional gaff.

A stopping sleeve 44 is a plastic cylinder inside the gaff handle 12. The purpose of the stopping sleeve 44 is to dampen the piston 46's return, and to hold the spring 42 slightly extended when the cocking lever 62 is at rest. Note that the linkage including element 66, 68 and 64 rotates past center when the cocking lever 62 is at rest. The slight spring tension applied against the links by the stopping sleeve 44 holding the spring 42 extended, serves to hold the cocking lever 62 against the gaff handle 12.

Figure 6:
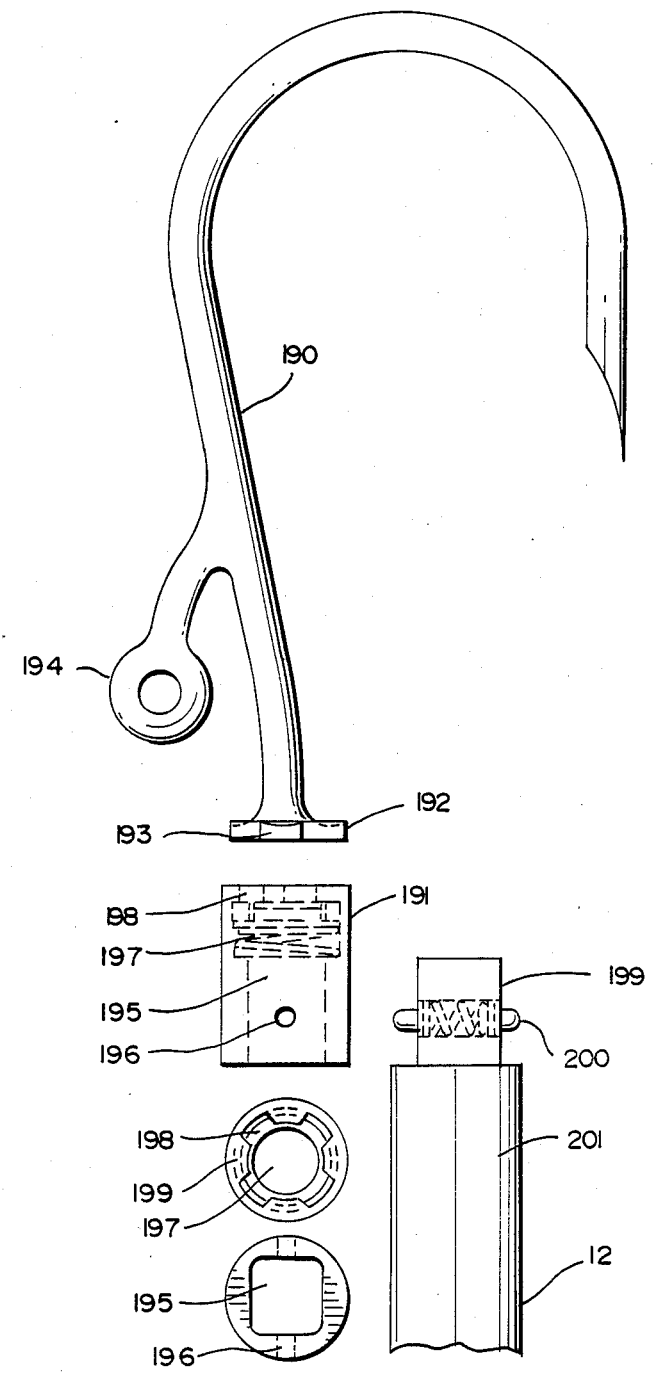
FIG. 6 is an exploded view partially in crosssection, of the hook part and release mechanism for a gaff according to the present invention.

Referring now to FIG. 6 an embodiment of a releasable hook 190 is shown with hook releasing mechanism to provide a quick and efficient means for releasably attaching a hook to a gaff such as the gaff 10 of FIG. 1.

To use the flying gaff a flying gaff coupler 191 is locked to the gaff handle 12 by inserting an external end of the piston 46 into a coupler receiver socket 191. When the coupler is in place, locking pins 200 extend into locking holes 196. This prevents the coupler 191 from separating from the piston 46. With the coupler 191 in place, the hook 190 can be fitted to the gaff by inserting a clover leaf base 192 of the hook 190 into a hook release socket 198 of the coupler 191. The hook base 192 has four leaves 193 extending from the hook 190 preferably at 90 degree intervals. The leaves 193 have a concave upper surface. Tabs 199 of the hook release socket 198 have a convex surface on their inward side. The hook base 192 is pressed against the piston and spring 197 to a depth which will allow rotation. The hook base 192 is rotated inside of the release socket 198 to align the concave surface of the leaves 193 with the convex surfaces of the tabs 199. With the hook 190 in place, the pressure applied by spring 197 on the base 192 will prevent free rotation of the gaff hook 190. The gaff is now cocked as herein described, and the gaff is operated as previously stated.

The flying gaff hook 190 is released by rotating the shaft 90 degrees to align the leaves 193 with the openings of the hook release socket 198, thus freeing the gaff hook 190 from the release socket 198. The hook can have a rope (not shown) secured to the flying gaff eye 194.

A gaff hook coupler 200 as shown in FIG. 8 and described in detail in FIGS. 7-14 can be used to secure a gaff hook 202 to a gaff hook piston 201. The gaff hook coupler 200 also provides a user with the ability to release the gaff hook 202, once it has been planted into a fish.

The gaff hook coupler 200 utilizes base surfaces 204 of a gaff hook base 203, and surfaces 205 of a coupler retaining ring 206. This is done to retain the gaff hook base 203 inside a gaff hook coupler housing 207. The gaff hook coupler housing 207 and a coupler lock nut 208 are threaded on to the gaff hook piston 201. A retaining ring 209 is then placed in a retaining ring groove 210 of the gaff hook piston 201. This prevents the coupler housing 207 from threading off the gaff hook piston 201. A flying gaff tension spring 211 is then placed on to the end of the gaff hook piston 201, and a tension spring end cap 212 is placed on the end of the tension spring 211. A gaff hook retaining ring 213 is threaded into the coupler housing 207 and against the spring end cap 212. When the gaff hook retainer ring 213 is seated in place, a retainer ring clip 214 is placed into a retainer ring groove 215 of the coupler housing 207. This prevents the gaff hook retainer ring 213 from rotating or threading out of the coupler housing 207.

When a gaff hook such as hook 202 is to be used, the gaff hook coupler housing 207 is threaded against the housing retainer ring 209. This removes the tension on the flying gaff tension spring 211. The base 203 of the gaff hook 202 is inserted into the gaff hook retaining ring 213. The base 203 of the gaff hook 202 will come in contact with the tension spring cap 212. The user must now apply a small amount of pressure to compress the tension spring 211 slightly. This allows the fingers 215 of the gaff hook base 203 to rotate under stops 216 of the gaff hook retaining ring 213. As the pressure against the tension spring 211 is released, the mating surfaces 204 of the gaff hook will interlock with the mating surfaces 205 of the hook retaining ring 213. The interlock of the gaff hook piston base 203 with the surfaces 205 of the retaining ring 213 will restrict rotation of the gaff hook 202. With the gaff hook in place in the gaff hook coupler, the user can now adjust the amount of pressure required to rotate the gaff hook to free it from the coupler.

The mating surfaces 204, 205 of the gaff hook base 203 and the retaining ring 213 are convex and concave surfaces, respectively. To rotate the gaff hook, these surfaces must rotate past each other. As they rotate, the gaff hook base 203 will be pressed against the tension spring 211. The more tension applied by the tension spring 211, the harder the hook base 203 will be to rotate. To increase this tension, the user would thread the coupler housing 207 further on to the gaff hook piston 201. As the piston 201 moves into the coupler housing 207, it will compress the tension spring 211. When the desired tension is attained, the locking nut 208 is threaded along the gaff hook piston 201, and firmly against the base of the coupler housing 207. This will hold the coupler housing 207 in place, and prevent the tension adjustment from changing. With the gaff hook in place, and the tension adjusted, the gaff can how be cocked and used. When the gaff hook has been set and the user wishes to release the hook, he simply pulls a retaining rope, which is tied to the flying gaff hook (not shown), and rotates the gaff handle 45 degrees, aligning the fingers 215 of the gaff hook base with slots 217 in the gaff hook retaining ring 213. The fish is now free of the gaff handle, and is retained by the gaff hook and the rope.

To employ a fixed gaff hook, the user would insert the hook into the coupler the same as with the gaff hook 202. After the hook is in place, the user would thread the coupler housing all the way on to the gaff hook piston. The piston will move into the coupler until it makes contact with the tension spring cap. Thus providing a solid link between the gaff hook piston and the base of the gaff hook. The base of a fixed gaff would differ from the gaff hook base 203. A concave surface on the gaff hook base of a fixed gaff would have stops on either side. The stops would prevent the gaff hook from rotating once in place in the coupler housing. When the gaff hook piston would be threaded solidly against the spring cap, rotation of the gaff hook base would be eliminated. This would provide a solid link between the fixed gaff hook and the gaff handle. The lock nut would be threaded securely against the base of the coupler housing, preventing any change in the adjustment.

A power gaff 300 according to the present invention as shown in FIGS. 16a–i uses spring tension to set a gaff hook 301 into a fish. The spring tension is supplied by a spring 325 inside a gaff handle 372. The gaff hook 301 is secured to a gaff piston 315 by a gaff hook coupler 305. The gaff hook coupler 305 allows the angler to interchange gaff hooks. The gaff hook piston 305 is in contact with one end of the compression spring 325. The gaff is cocked by a lever action device. A cocking device 374 utilizes a folding linkage 329 to extend the gaff hook piston 315 in one direction, and compress the drive spring 325 when moved in the opposite direction. The gaff hook piston 315 is held in the cocked position by a release trigger 350.

When an angler retrieves a catch, and a gaff is to be used to land the fish, the power gaff 300 can be cocked and ready to be used by simply swinging the cocking lever 374 away from the gaff handle 372. The cocking lever 374 rotates an axle pin 375 of the folding linkage 329. A drive link 332 of the folding linkage is mounted nonrotatably to the axle pin 375. The drive link 332 forces a driven link 333 against a spring plunger shaft 321. The plunger shaft pushes against the gaff hook piston 315. As the cocking handle 374 rotates the axle pin 375, the gaff hook piston 315 is forced out the end of the gaff handle 372. When the cocking lever 375 has been moved to the extent of its travel, the user depresses a trigger safety lever 386 momentarily. Depressing the safety lever 386 with the cocking lever 374 swung away from the gaff handle 372 allows the safety bar 354 to move from the upper side of a safety guide pin 358 to the underside of the guide pin 358. As the trigger safety lever 386 is released, the automatic trigger 350 is rotated by the trigger tension spring 348, engaging a locking bar 352 into a gaff hook piston locking groove 319. With the locking bar 352 in place, the gaff hook piston 315 is prevented from returning inside the gaff handle 372. With the safety lever 386 released, the safety locking bar 354 is on the underside of safety guide pin 358. This prevents the automatic trigger 350 from rotating the locking bar 352 out of the gaff hook piston locking groove 319. The cocking lever 374 is now rotated back against the gaff handle 372. As the cocking lever rotates the axle pin 375, the folding linkage 329 contracts, pulling the spring plunger shaft 321 thus compressing the gaff hook piston drive spring 325. The power gaff is now cocked and ready to use. The gaff is now used as if it were a conventional gaff but setting the hook is done automatically. As the user approaches the fish with the gaff hook, he or she depresses the safety lever. As the user draws the gaff hook towards himself, the fish will come in contact with the automatic trigger. This in turn rotates the locking bar out of the locking groove in the gaff hook piston. With the locking bar disengaged, the spring tension supplied by the gaff hook piston drive spring, drives the gaff hook piston rapidly back into the gaff handle. This rapid movement sets the gaff hook properly into the fish by pulling the hook into the target area.

The safety lock and manual trigger mechanism are incorporated together in a dual lever control located at the end of the gaff handle, opposite the gaff hook. The safety lock lever and the manual trigger can be operated with the index and middle finger of the same hand. This is done to limit the grip loss by the hand of the user.

The safety lock is a small but strong bar 354, which prevents the automatic trigger 350 from rotating the locking bar 352 out of the locking groove 319 in the gaff hook piston 315. As long as the locking bar 352 remains in the locking groove 315, the gaff hook piston 315 cannot be recoiled into the gaff handle 372, thus preventing discharge of the power gaff by accidental contact of the automatic trigger 350. The safety bar 354 is inserted into a receiver channel 351 in the automatic trigger 350. The safety bar is held in place by a return spring 353. The safety release and the manual trigger, utilize a common cable 368 which is attached at one end to the safety bar 354. The safety bar serves two functions, it not only provides a lock for the automatic trigger, it also serves as the release ramp for the manual trigger. The safety bar 354 passes between two pins mounted in the automatic trigger housing 358, 359. The upper pin 358 is the safety guide pin, and the lower pin 359 is the manual trigger ramp pin. The safety bar 354 has a flat plate 356 paralleling the upper edge of the safety bar. This plate protrudes inwards from the safety bar towards the automatic trigger housing. The plate starts at the middle of the safety bar 354 and runs roughly ⅓ of the distance to the rear of the safety bar 354. The upper and lower surfaces of this bar will serve as the mating surfaces for the safety guide pin 358. With the safety employed, the lower side of the safety guide pin will rest against the upper surface of the safety plate 356. This will prevent the automatic trigger arm 350 from rotating. When the user depresses the safety lever 386, the safety lever 386 will make contact with the manual trigger lever interlock pins 390. This will occur at a point about halfway through the safety lever's travel. The manual trigger lever 388 will be rotated also, via the interlock pins 390. This movement of the manual trigger lever 390 is equal to half of the range of travel needed for manual discharge. The safety cable 368 is attached to the safety bar 354 at one end, and to the manual trigger interlock pin 390 at the other. Therefore, as the manual trigger lever 388 rotates, it begins to pull the safety bar 354 from the receiver socket 351. The movement of the safety bar 354 allows the safety plate 356 to pass beyond the safety guide pin 352. This will allow rotation of the automatic trigger.

After the gaff hook piston has been recoiled and the safety lever has been released, the second function of the safety mechanism comes into play. This function prevents accidental cocking of the power gaff, and also prevents the user from cocking the gaff without the safety being employed. With the gaff hook piston recoiled into the gaff handle, the locking bar of the automatic trigger rests on the lower side of the gaff hook piston. This prevents the automatic trigger lever from rotating to an upright position. When the safety lever is released, and the safety bar is pulled into the receiver socket, the lower surface of the safety plate 356 is above the safety guide pin 358. If the cocking lever 374 is rotated away from the gaff handle 372, extending the gaff hook piston 315, the trigger tension spring 348 will not be able to rotate the automatic trigger lever 350 until the safety lever 386 is depressed, thus allowing the locking bar safety plate 354 to move past the locking pin 358. This makes it impossible for the user to cock the power gaff without employing the automatic trigger safety.

The manual trigger allows the user to recoil the gaff hook piston. This is done by depressing the manual trigger lever 388 at the end of the gaff handle, opposite the gaff hook 301. The manual trigger lever 388 is housed inside the safety lever 386 when the levers are at the rest position. The safety lever 386 has slots 389 in either side to receive a trigger interlock pin 390. The manual trigger lever has a hole through it, which houses the interlock pin. The safety and manual trigger cable 368 has a threaded shaft 387 on the end of the cable opposite the safety bar 354. A threaded shaft 387 passes through a slot in the manual trigger 388, and through the hole in the interlock pin 390. A cable adjusting nut 392 is threaded on to the cable shaft 387, which prevents the cable shaft 387 from being pulled back through the interlock pin 390. When the power gaff is to be used, the safety lever 386 is depressed. As stated previously, the safety lever slots 389 will engage the interlock pin 390 halfway through the safety lever's 386 travel. The second half of travel pulls the manual trigger 388 via the interlock pin 390. The interlock pin 390 is affixed to the manual trigger lever 388, and the cable 368 is affixed to the interlock pin 390. As the cable 368 is drawn by the safety lever 386, interlocking with the manual trigger 388, the safety bar plate 354 is drawn past the safety guide pin 358. At this point the gaff is ready to be discharged by either the manual trigger 386, or the automatic trigger 350. Manual discharge is controlled by the manual trigger lever 388. The manual trigger 388 has been exposed by the rotation of the safety lever 386. While holding the safety lever 386 depressed, the user can now place the forefinger of the same hand on the manual trigger 388. Depressing the manual trigger will draw the safety bar plate 354 further from the receiver socket 351. On the lower edge of the safety bar plate 354 another plate 357 is set an an angle to the plane of the safety bar plate 354. The angle of this plate provides the automatic trigger 350 rotation needed for discharge. As the safety bar plate 356 is drawn past the safety pin 358, the discharge plate 357 engages the discharge pin 359. As the manual trigger 388 draws the cable 368 further, the inclined plane of the discharge plate 357 will travel across the discharge pin 359. The automatic trigger lever 350 will be forced to rotate, pulling the locking bar 352 out of the locking groove 319. This allows the power spring 325 to pull the gaff hook piston 315 into the gaff handle 372.

When a fish has been brought along side a boat and is ready to be gaffed, the user needs to cock the power gaff in preparation. The gaff cocking lever 374 is swung away from the gaff handle 372, extending the gaff hook piston. The safety lever 386 is depressed and released, allowing the locking bar 352 to engage the locking groove 319. The cocking lever 374 is now rotated back to its rest against the gaff handle 372. This will compress the piston drive spring 325. The power gaff is now cocked and ready to use. The user now aligns the gaff hook with the fish. As the user draws the gaff hook towards the fish, he or she depresses the safety lever 386 with the middle finger of his hand, at the end of the gaff handle. If automatic triggering is desired, the user should place the forefinger of the same hand behind the manual trigger 388. This will prevent accidental depression of the manual trigger. The gaff will now discharge when contact with the fish is made by the automatic trigger 350. If manual triggering is desired, the user would place his forefinger on the manual trigger 388 while depressing the safety lever 386, using the forefinger to depress the manual trigger lever 388 when discharge is desired.

In another embodiment of a gaff according to this invention a fish weighing scale as part of the gaff utilizes the spring tension of the gaff hook recoil spring. With the gaff handle held vertical, and the gaff hook at the lower end, a calibrated scale on the gaff hook piston indicates the pull on the gaff hook by the amount that the gaff hook piston has traveled out of the gaff handle, thereby compressing or expanding the gaff hook recoil spring. By using a spring to recoil the gaff hook piston, that has a predetermined and constant tension rate, the distance the spring compresses or expands, due to the pull on the gaff hook, will remain constant. If the amount that the piston travels out of the gaff handle is known, the amount of weight required to produce this travel is equal to the distance times the tension rate of the spring. With this information known, a scale measuring piston travel can be presented on the gaff hook piston, substituting distance reference points with weight reference points. The scale can be used after gaffing the fish, or anytime the angler wishes to know the weight of the fish. The fish is placed on the gaff hook, and the gaff is held vertical, with the fish hanging from the hook freely suspended. The gaff hook piston will be pulled from the gaff handle by the weight of the fish. The weight indicated by the scale on the gaff hook piston, at the point it enters the gaff handle, is equal to the weight of the fish.

Figures 15A, 15B, 15C:
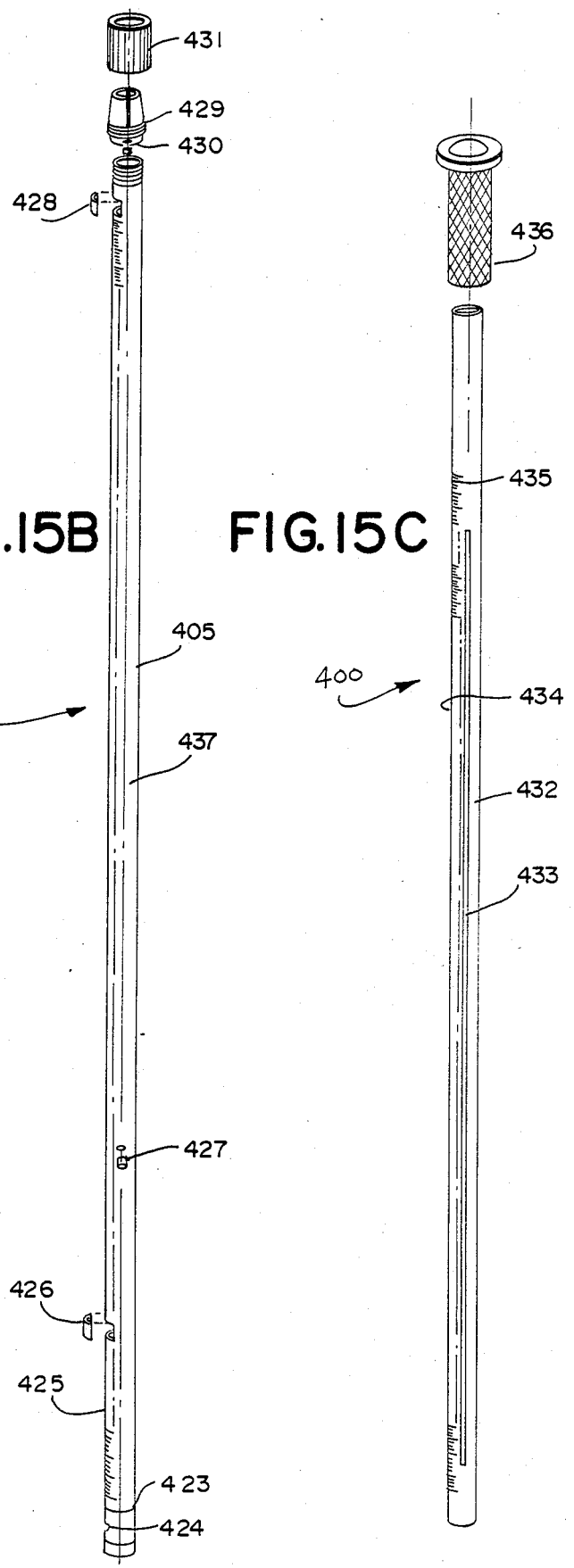
FIGS. 15a–c show a gaff according to the present invention in exploded views from the side.
Figure 16A:
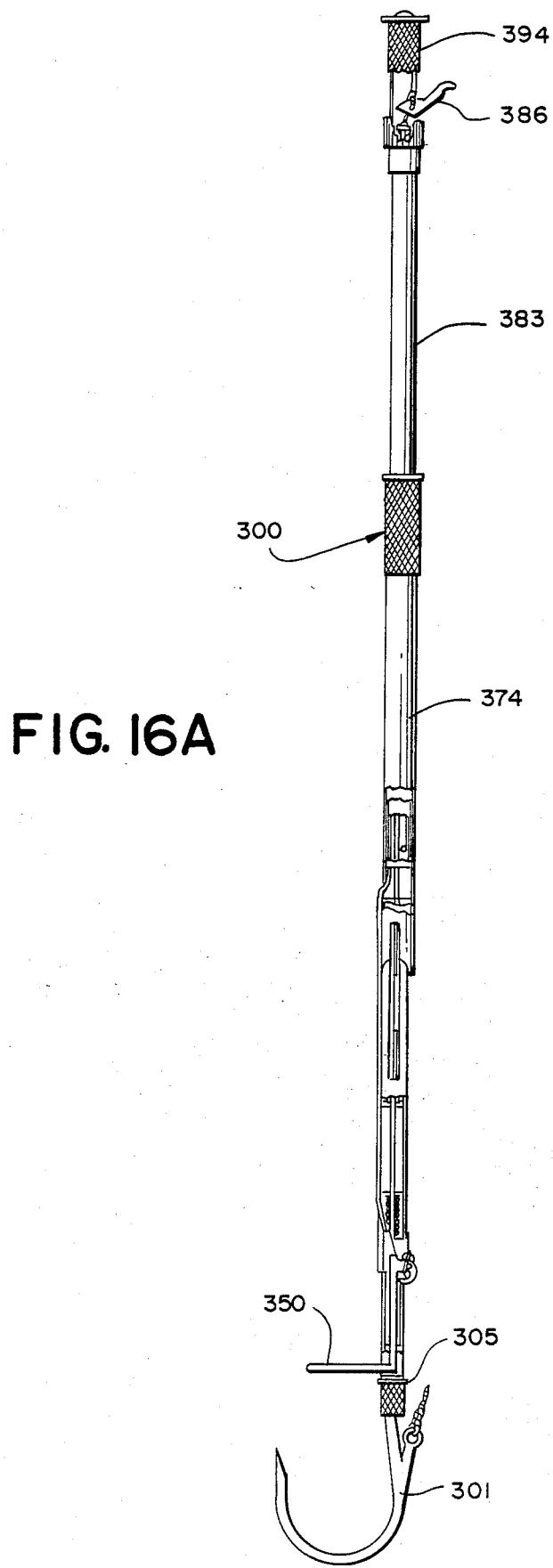
Figure 16E:
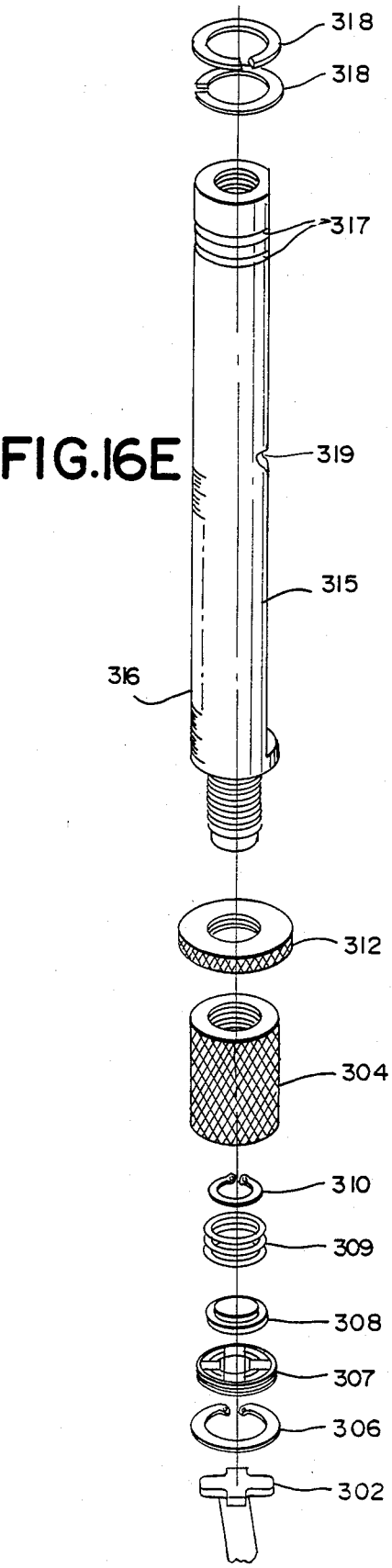
Figure 16F:
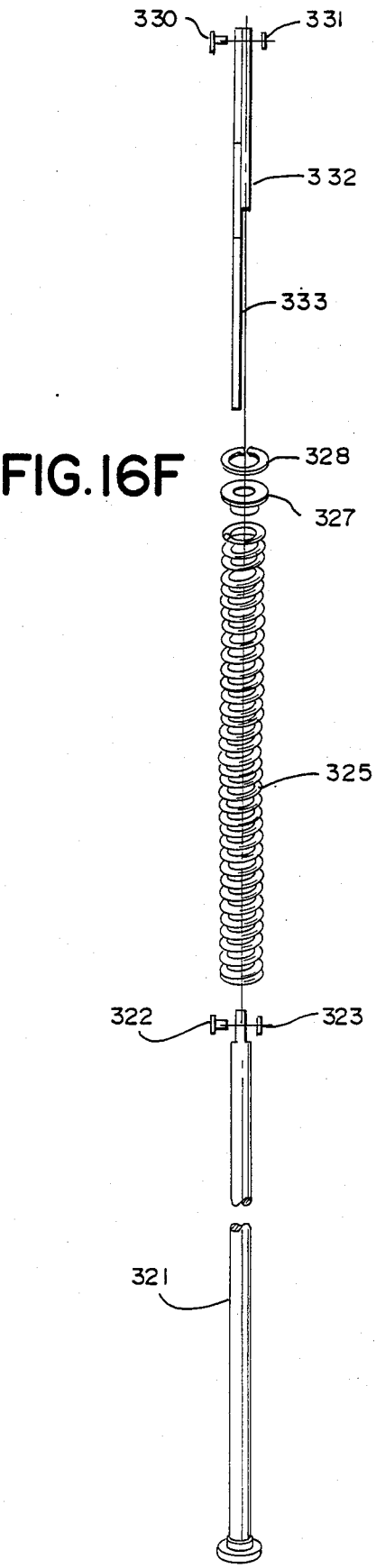

The gaff as shown in FIGS. 15a–c has a fish length measuring device which utilizes the gaff handle to measure the fish's length. This is accomplished by etching or printing the scale on the side of the gaff handle. The scale would be continued on the gaff handle extension for larger fish. A scale is printed on the gaff handle, starting at the gaff hook end, and going the length of the gaff handle Another scale starting at the point the first scale ended, would begin at the hand grip on the handle extension, and would run the length of the extension. When measuring the length of a fish larger than the gaff handle, the handle extension would be extended to the length of the fish. The length indicated by the number at the point the extension enters the gaff handle, would represent the length of the fish. The user simply lays the gaff along side the fish to be measured. By aligning the "0" mark of the gaff scale with one end of the fish, the distance indicated by the number on the scale adjacent to the other end of the fish, will represent the length of the fish. In the event the fish is longer than the gaff handle, the gaff handle extension is pulled out until the end of the fish lines up with the first mark on the gaff extension. The length of the fish is then indicated by the number at the point the extension enters the gaff handle.

A gaff 400 as shown in FIGS. 15a–c has a gaff hook piston coupler 401, to allow the user to change gaff hooks, or to convert to a flying gaff easily. A gaff hook piston 402 and drive spring 403 are used as part of a fish weighing device. The ability to use the drive spring pressure to set a gaff hook 404 into the fish, although possible, is not shown in the gaff 400. The ability to lock the gaff hook piston 402 into a gaff handle 405, to prevent the drive spring 403 from dampening the impact of the gaff hook 404, is achieved by a gaff piston lock 406. When the fish is brought along side the boat, the user employs the gaff 400 in the same manner as he would if using a conventional gaff. One exception to this, is when using the flying gaff hook, the release of the hook is accomplished by pulling a retaining rope tied to the hook (not shown) and twisting the gaff handle.

The gaff 400 employs a gaff hook coupler 438 similar to those previously described. The gaff 400 also has the ability to change gaff hooks and convert the gaff to a flying gaff. A fish weighing scale of the gaff 400 is located on a skirt 437 on the upper end of the gaff hook piston 402. The scale is read through a small window 426 in the side of the gaff handle 405. As the gaff hook piston 402 is drawn from the gaff handle 405 by the weight of the fish, the scale is drawn past the scale window 426. The weight of the fish is determined by aligning a number on the scale 410 with an alignment mark on the scale window 426.

The piston lock 406 locks the gaff hook piston 402 inside the gaff handle 405 to prevent the weight spring from dampening the impact of the gaff hook. The piston lock uses a steel ball 420 pressed into a ball seat 408 in the gaff hook piston 402. To prevent piston movement, the ball 420 is placed into a hole 424 in the gaff handle 405, which aligns with the ball seat 408 in the gaff hook piston 402. A piston lock sleeve 419 is then placed over the steel ball 420. With the lock sleeve 419 in place, a retainer ring clip 421 is inserted into a retainer ring groove 423 in the gaff handle 405 to hold the lock sleeve 419 in place. Two steps 422, cut into the inner race of the lock sleeve 419 will interact with the locking ball 420 to lock the gaff hook piston 402 in place. To lock the piston 402 into the gaff handle 405, the locking sleeve 419 is rotated until the first step is forced to move over the locking ball 420. Thus preventing the ball from lifting out of the ball seat 408 in the gaff hook piston 402, locking the piston inside the gaff handle. To release the gaff hook piston 402 the locking sleeve 419 is rotated in the opposite direction, aligning the locking ball 420 with the second step. The clearance between the locking ball 420 and the second step of the locking sleeve 419 is sufficient to allow the locking ball 420 to raise from the ball seat 408. This allows the gaff hook piston 402 to move freely under the locking ball 420.

To measure the length of the fish, the user aligns one end of the fish with a zero mark 435 on a gaff handle extension 432. The number indicated on a gaff handle scale 425 adjacent to the other end of the fish will represent the length of the fish. In the event that the fish is longer than the gaff handle 405, the fish would be aligned with the last mark on the gaff handle scale 425. A gaff handle extension 429 would then be pulled from the gaff handle 405 until the zero mark aligns with the other end of the fish. The length indicated in a measuring window 428 in the gaff handle will represent the length of the fish. This is accomplished by having the scale on the scale extension 434 begin with the last number of the scale on the gaff handle 425. With the extension 432 all the way in to the gaff handle, the number that appears in the measuring window 428 will be the same as the last number on the gaff handle 425. As the extension 432 is drawn from the gaff handle 405, the scale on the extension will pass under the window 428. The number indicated in the window will be the sum of the last number on the gaff handle plus the distance the extension 432 has traveled, thus indicating the total length of the fish.

In the gaff 400, component 407 is the hook coupler lock ring. The lock ring is threaded against the hook coupler 401 to prevent the coupler 401 from moving after the coupler release tension has been adjusted.

Components 409 are grooves cut into the gaff hook piston. These grooves are to house piston rings 413. With piston rings 413 in place, and the piston in place inside the gaff handle 405, the rings serve to prevent water from entering into the gaff handle 405, around the gaff hook piston 402.

The handle end cap 411 has a flat surface on its inside radius which interacts with the flat surface on the bottom of the gaff hook piston 402. This interaction prevents the piston 402 from rotating inside the gaff handle 405. Once the gaff hook piston is aligned properly with the gaff handle, the locking screw 412 is tightened to prevent the handle and cap 411 from rotating.

In the gaff 400, the gaff described is a conventional gaff with a fish weighing device, and length measuring scale incorporated into the gaff handle. The weighing device is assembled and performs as follows: the gaff hook piston 402 is suspended from the plunger shaft 414. This is accomplished by placing the piston tension spring 403 over the plunger shaft 414 until the spring 403 rests on the stop at the end of the shaft 414. The spring retainer cap 415 is then placed on the end of the tension spring 403. The plunger shaft 414, spring 403, and end cap 415 are now slid into the spring bore in the end of the gaff hook piston 402. The spring locking ring 416 is then placed into a locking ring groove in the end of the spring bore. This retains the spring 403 and plunger shaft 414 inside the spring bore. The plunger shaft mounting block 417 is then threaded onto the end of the plunger shaft 414, followed by the shaft lock nut 418. This prevents the shaft 414 from turning inside the mounting block 417. The piston 402, plunger shaft 414, spring 403, and mounting block 417 are now inserted into the end of the gaff handle 405. The mounting block retainer pin 427 is then pressed into the mounting block 417 through a small bore in the side of the gaff handle 405. This holds the scale assembly inside the gaff handle 405. The gaff hook piston 402 is now free to travel in and out of the gaff handle 405 against the tension of the spring 403. The weight placed on the gaff hook 404 will compress the tension spring 403 by the spring end cap 415 being pulled down the plunger shaft 414 against the tension spring 403. The distance the piston 402 will travel is determined by the spring rate and the weight placed on the gaff hook 404.

If the need to extend the gaff handle should arise, this capability is provided as follows: An extension clamp 429 is threaded onto the end of the gaff handle 405. The extension clamp 429 has an inside radius equal to the outside diameter of the extension tube 432. The outside radius of the clamp 429 is cone shaped, with a threaded section at the larger diameter of the clamp 429. The threaded section is made to receive the clamp pressure sleeve 431. The clamp pressure sleeve 431 is bored and threaded at one end, to mate with the threads on the extension clamp 429. The other end of the pressure sleeve 431 has a bore slightly larger than that of the smaller diameter of the extension clamp 429. With the clamp 429 and the pressure sleeve 431 in place, the extension tube 432 is inserted into the extension clamp 431. It is necessary to prevent the extension tube 432 from rotating inside the gaff handle 405, thus keeping the measuring scale 434 aligned with the scale window 428. To prevent the tube 432 from rotating, a groove 433 has been cut into the outer wall of the extension tube 432. With the tube 432 in place, the retainer pin 430 is threaded through a small bore in the extension clamp 429 and gaff handle 405. As the end of the pin 430 passes into the inside of the gaff handle 405, it will encounter the groove 433 in the extension handle 432. The interaction of the pin 430 and the groove 433 will prevent the tube 432 from rotating, but will allow the tube to slide in and out of the gaff handle 405 a distance equal to the length of the groove 433.

How the extension clamp 429 and the extension tube 432 interact, to provide the gaff handle with the ability to extend, is as follows: The pressure sleeve 431 is threaded off of the extension clamp until the pressure between the cone shaped surface of the extension clmap 429 and the small bore of the pressure sleeve 431 is relieved. With the clamp pressure removed, the extension tube 432 can be adjusted to the proper length by pulling on the extension handle grip 436. When the proper length is obtained, the pressure sleeve 431 is threaded securely onto the extension clamp 429. As the smaller diameter of the pressure sleeve 431 moves up the cone shaped portion of the extension clamp 429, the inner race of the clamp 429 is collapsed onto the extension tube 432. Thus clamping the tube 432 in place.

The ability to change gaff hooks 404, or to convert the gaff 400 into a flying gaff is provided by the interaction of the gaff hook coupler 401 and the gaff hook base 439, as previously described.

Another automatic trigger according to this invention, automatic trigger 500, shown in FIGS. 17a, b, operates in a manner similar to that of the automatic trigger described previously. The automatic trigger lever 502 will discharge a gaff 520 when brought in contact with a fish. With a gaff cocked and ready to use, and having a trigger 500, a locking bar 502a, of the automatic trigger lever 502 is inside a locking groove 504a of a gaff hook piston 504. This prevents the piston 504 from being pulled into a gaff handle 502 by a power spring 504b. As the automatic trigger lever 502 is brought into contact with the fish, and the trigger 502 rotates, it will pull the locking bar 502a out of the locking groove 504a. This allows the power spring 504b to pull the piston 504 into the gaff handle 507, forcing a gaff hook 501 into the fish.

Trigger safety is designed to prevent accidental discharge of the power gaff. Safety is provided by the interaction of the safety bar 502b, and a locking safety plate 505b, of a manual trigger striker 505. With the gaff cocked and ready to use, and the safety lever 504 in the rest position, the locking plate 505b will be in front of a safety stop 502c on the safety bar 502b. This will prevent the automatic trigger lever 502 from moving, thus keeping the locking bar 502a in the locking groove 504a. This interaction will prevent accidental discharge by the automatic trigger.

To release the safety, the user would depress a safety lever 511. As the safety lever 511 rotates halfway through its travel, an interlock bar 511b will come in contact with a manual trigger lever 510. The interlock bar 511b will then cause the manual trigger lever 510 to rotate with the safety lever 511, through the remainder of the safety lever's travel. As the manual trigger 510 rotates, it will pull a release cable, raising the striker 505. Raising the striker by depressing the safety lever will allow the safety stop 502c to pass under the safety plate 505b. This allows the automatic trigger lever 502 to rotate.

Another safety feature of this design is the manual trigger safety. Manual trigger safety is provided by the interaction of a manual trigger safety ramp 510a on the manual trigger 510 and a safety tab 511a of the safety lever 511. With both the safety lever 511 and the manual trigger lever 510 at rest, the safety tab 511a will be between the safety ramp 510a and a trigger housing 512. The safety tab 511a will prevent the safety lever 511 and the manual trigger 510 from rotating at the same time. This occurs during the first half of the safety lever's travel. After the safety lever 511 has been rotated far enough that the interlock bar 511b contacts the manual trigger 510, the safety tab 511a will have been rotated past the safety ramp 510a. With the safety tab 511a past the safety ramp 510a, the manual trigger lever 510 will be free to rotate. This design will prevent discharge of the gaff by accidental contact of the manual trigger 510 safety lever 511 assembly.

To discharge the gaff 520 manually, the gaff 520 has been equipped with a manual trigger lever 510. The safety lever 511 interlocks with the manual trigger lever 510 when the safety lever 511 has been rotated halfway through its travel. During the rotation, the manual trigger 510 has been exposed from within the safety lever 511. To discharge the gaff 520 manually, the user would depress the manual trigger lever 510 after the safety lever 511 has been fully rotated. By depressing the manual trigger lever 510, a manual trigger cable 506 is pulled further. This movement is sufficient to pull the striker discharge pin 505a against the safety bar 502b. As the manual trigger lever 510 is depressed further, the discharge pin 505a will raise the safety bar 502b. This will rotate the automatic trigger lever 502 pulling the locking bar 502a out of the locking groove 504a and discharging the gaff.

The safety and manual trigger operate by using the cable 506 to move the striker 505. The cable adjustment is critical to the proper operation of the gaff. The safety lever 511 and the manual trigger lever 510 are part of a gaff extension 509. When it becomes necessary to use the gaff extension 509, it is important that the cable 506 stay adjusted properly in any extension adjustment position. This is accomplished by the cable network. This network operates as follows: The triger cable 506 is secured to the striker 505 at one end. The cable 506 then enters a cable housing 506a that runs along the outside of the gaff handle 507. The cable 506 enters the gaff handle 507 after it passes a folding linkage housing 508. The cable then travels the length of the gaff handle 507 to an idler pulley 506b. The cable turns 180 degrees around the idler pulley 506b and travels back down the extension tube 509 to an extension pulley 506c. The cable now takes another 180 degree turn and runs up the extension tube 509 to a manual trigger adjuster pulley 506d. The cable 506 makes a third 180 degree turn around the trigger pulley 506d and returns to the idler pulley block 506b where it is secured. A second cable 506f is secured to the opposite end of the idler pulley block 506b and to the folding linkage housing 508. The cable 506f prevents the idler pulley block 506b from moving, due to tension placed on the trigger cable 506.

In this pulley configuration, the relationship between the three pulleys does not change in total distance as the extension tube 509 is moved in or out of the gaff handle 507, as long as the extension pulley 506 does not pass the idler pulley block 506b. This configuration allows the cable 506 adjustment tension to remain the same throughout the extension tube's operating range.

Cable adjustment is accomplished by tightening the cable adjuster 506 until proper cable tension and striker 505 position is acquired. This adjustment sets the total distance between the three pulleys 506b, c, d to match the length of the cable 506.

Another feature of the three pulley arrangement is that the ratio between the trigger travel and the cable travel is, preferably, 2 to 1. In this embodiment, the distance that the manual trigger pulley 506d travels will be only half the distance that the striker 505 will move.

Thus, it is seen that the gaffs of the present invention readily achieve the ends and advantages mentioned as well as other inherent therein. While certain preferred embodiments of the present invention have been described and illustrated for the purposes of disclosure, it will be clear to one of skill in this art who has the benefits of this invention's teachings that changes in the arrangement and construction of parts may be made which changes are embodied within the spirit and scope of the present invention as claimed below. It is intended that each element recited in any of the following claims and each combination of elements is to be understood as referring to all equivalent elements or equivalent combinations for accomplishing substantially the same results in substantially the same or equivalent manner.

What is claimed is:

1. An automatic gaff comprising
a handle having a first end and a second end,
a hook movably mounted to the first end of the handle,
a releasable spring-loading mechanism having a spring therein, the spring-loading mechanism operatively connected between the hook and the handle for providing releasable spring tension of the spring on the hook, for moving the hook toward the second end of the gaff,
an automatic trigger mechanism connected to the spring-loading mechanism for automatically releasing the spring tension of the spring when a thing to be gaffed comes into contact with a part of the automatic trigger mechanism so that the spring forcefully moves the hook toward the second end of the handle, and
a cocking mechanism means for restricting a spring of a spring loading mechanism comprising:
(a) cocking handle,
(b) cocking lever,
(c) drive link,
(d) axial pin,
(e) driven link,
(f) expansion spring,
(g) gaff piston, and
(h) locking bar,
whereby, the cocking lever rotates the axial pin forcing the drive link against the driven link, the driven link pushes the expansion spring against the gaff piston forcing the piston further out of the gaff handle until the locking bar of the automatic trigger engages a locking groove on the piston, thus holding the piston stationary, the cocking handle is now rotated back to the gaff handle, whereby the axial pin is rotated, pulling the drive link against the driven link, the driven link is connected to one end of the expansion spring, where the other end of said expansion spring is connected to the piston; therefore, when the driven link is pulled into place the expansion spring is restretched and the gaff is then ready for use.

2. The gaff of claim 1 wherein the hook is releasably mounted to the handle for conversion into a flying gaff.

3. The gaff of claim 2 wherein a trigger part of the automatic trigger mechanism is disposed near the hook so that the automatic trigger mechanism can be activated by a fish or animal contacting the trigger part.

4. The gaff of claim 1 including also a manual trigger interconnected with the spring-loading mechanism which can be manually operated by a user of the gaff to release the spring-loading mechanism to move the hook toward the second end of the gaff.

5. The gaff of claim 1 including also a selectively actuable safety device connected to the spring-loading mechanism for preventing release of the hook until a user of the gaff actuates the safety device.

6. The gaff of claim 4 including also a selectively actuable safety device connected to the manual trigger and the automatic trigger mechanism for deactivating the automatic trigger mechanism so that the manual trigger may be operated without fear of the automatic trigger mechanism being activated.

7. The gaff of claim 1 including also a weighing scale on the handle, a weighing mechanism connected to the hook, and the weighing mechanism having an indicator for indicating on the weighing scale the weight of something held on the hook.

8. The gaff of claim 1 including also a length scale on the handle.

9. An automatic gaff comprising:
a handle having a first end second end;
a hook movably mounted to the first end of the handle,
a releasable spring-loading mechanism having a spring therein, the spring-loading mechanism operatively connected between the hook and the handle for providing releasable spring tension of the spring on the hook, for moving the hook toward the second end of the gaff,
an automatic trigger mechanism connected to the spring-loading mechanism for automatically releasing the spring tension of the spring when a thing to be gaffed comes into contact with a part of the automatic trigger mechanism so that the spring forcefully moves the hook toward the second end of the handle, and
a cocking mechanism, means for recompressing a spring of a spring loading mechanism comprising;
(a) cocking lever,
(b) drive link,
(c) spring plunger,
(d) axial pin,
(e) gaff piston,
(f) locking bar, and
(g) compression spring,
whereby, the drive link is hinged at one end to the cocking lever and is hinged to the spring plunger on the other end, as the cocking lever is rotated on the axial pin the drive link is forced against a spring plunger, the spring plunger is forced against the gaff piston pushing the piston further out of the gaff handle until the locking bar of the automatic trigger engages a locking groove in the piston, thus holding the piston in place, the cocking lever is now rotated in the opposite direction pulling the drive link against the plunger as the piston is pulled into place the compression spring is recompressed and the gaff is now cocked and ready for use.

* * * * *